March 19, 1935.  A. J. MEYER  1,994,528
ENGINE
Filed April 5, 1932
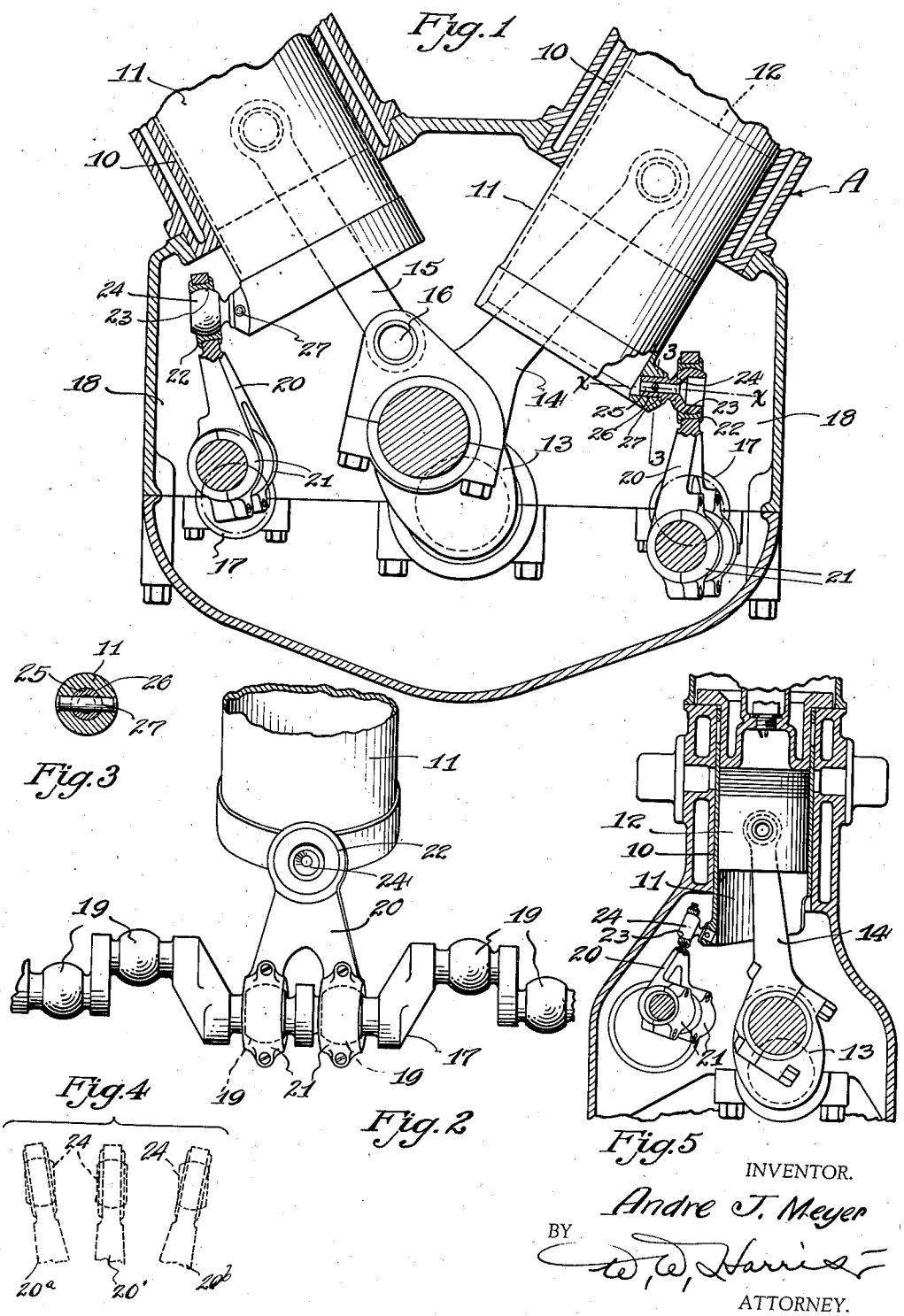

Patented Mar. 19, 1935

1,994,528

UNITED STATES PATENT OFFICE 1,994,528

ENGINE

Andre J. Meyer, Detroit, Mich., assignor to Continental Motors Corporation, Detroit, Mich., a corporation of Virginia Application April 5, 1932, Serial No. 603,353

9 Claims. (Cl. 123—81)

This invention relates to internal combustion engines and refers more particularly to engines of the sleeve valve type. In its more specific aspects my invention relates to improvements in driving mechanisms for single sleeve valve engines of the combined reciprocating and oscillating type wherein any point on the sleeve valve traces a closed curve path with respect to the associated cylinder.

It is an object of my invention to provide improvements in the aforesaid type of sleeve drive especially adapted for use in connection with the wobble type of sleeve driving valve shaft.

A further object of my invention resides in the provision of an improved drive wherein the sleeve ball portion has its axis positioned at an angle with the plane perpendicular to the sleeve axis whereby the sleeve end of the sleeve driving link is caused to oscillate about substantially the center of the ball portion for substantially the same amount as it moves toward and from the sleeve. By reason of such construction I am enabled to fully utilize the area of the ball portion surface and the ball portions may therefore be made smaller than heretofore so as to lighten the weight of this reciprocating part.

A further object of my invention resides in the provision of a sleeve driving mechanism wherein the sleeve link operated by the wobble crank is substantially straight without bending action, resulting in a stronger, lighter, and more compact structure and assembly.

A further object of my invention in one embodiment thereof resides in providing an improved sleeve driving arrangement and structure for engines having V-arranged cylinders.

Further objects and advantages of my invention will be apparent as this specification progresses, reference being had to the accompanying drawing illustrating one embodiment thereof, and in which:

Fig. 1 is a sectional elevation view through an engine illustrating my invention, Fig. 2 is a side elevation view of one of the sleeve valves and improved driving mechanism, Fig. 3 is a detail view along the line 3—3 of Fig. 1 showing the connection for the ball portion and sleeve valve, Fig. 4 is a diagrammatic view illustrating the sleeve link in its opposite positions of movement and in the co-planar position with the ball portion of the sleeve valve, and Fig. 5 is a sectional elevational view of a typical single cylinder of an in line engine and illustrating my improved driving connection.

Referring to the drawing, engine A is provided with one or more cylinders 10 and in the illustration I have shown my invention in connection with an engine of the V-type although my invention in its broader aspects is not limited to this type of engine or to any particular arrangement of cylinder grouping.

Associated with each cylinder 10 is a sleeve valve 11 and operating within the sleeve valve is the usual piston 12 actuating crankshaft 13 by reason of connecting rod 14. In the V-type of engine it is customary to actuate one of the pistons by reason of a rod 15 articulating at 16 with the connecting rod 14. Each of the sleeve valves 11 is adapted to be actuated as aforesaid by a valve shaft 17 positioned in crankcase 18, the valve shaft having a plurality of pairs of ball portions 19 associated with each sleeve valve, each pair forming a wobble crank for moving the sleeve valve through the intermediary of a sleeve link or wobble link 20. This link constitutes a three point actuating device, two of which points are in the nature of socket portions 21 engageable with the associated ball portions 19 and the third point is formed with a socket portion 22 engaging with the ball portion 23 of the sleeve driving lug 24. It will be noted that the axis X—X of the ball portion 23 and the lug 24 extends at an angle with a plane perpendicular to the sleeve axis and the axis X—X and preferably extends downwardly and inwardly toward the lower portion of sleeve 11. The lug 24 has a stem 25 positioned within the cylindrical opening 26 of the sleeve valve and is fixed in position by any suitable means such as by a rivet 27 best shown in Fig. 3. The link 20 extends substantially in a plane between the wobble crank and sleeve ball whereby it is substantially free from bending tendencies since all of the force transmitted through the link is direct tension or compression in the link itself. Heretofore it has been found necessary to provide a bend along the longitudinal length of the link with a resulting bending moment longitudinally of the link. This has made it necessary to provide a link of relatively heavy weight in order to provide the necessary strength with the attendant disadvantages of relatively large mass operated at high speed, it being understood that valve shaft 17 is driven at half engine speed in the usual manner for a four stroke cycle engine. By reason of my invention I am enabled to make the link 20 relatively light since the longitudinal bending moments have been eliminated by reason of my arrangement of link, valve shaft, and sleeve ball portion having its axis positioned at the aforementioned angle to the plane perpendicular to the sleeve axis.

A further important advantage resulting from my invention resides in a link socket which moves from a co-planar relationship with the associated sleeve ball portion for substantially an equal amount during its movement toward and from the sleeve valve. Referring to Fig. 4 the link position indicated by 20' represents the aforesaid co-planar relationship, the link position 20ª indicating the extreme movement of the link toward the sleeve valve and the position 20ᵇ representing the extreme opposite movement away from the sleeve valve. From these views it will be noted that substantially the same amount of area of the ball portion 23 is exposed during these opposite movements of the link and this results in providing a more efficient ball and socket construction. Thus I am enabled to use effectively the whole of the ball portion surface so as to further reduce the weight of these reciprocating parts, provide a more compact construction, and facilitate lubrication of the ball and socket joint as the ball portion areas are exposed to the oily mist in crankcase 18 for substantially equal amounts in its opposite directions of swing.

In one specific adaptation of my invention I have provided improvements in the V-type engine generally illustrated in Fig. 1. Thus it will be noted that the links 20 extend substantially vertically while the ball portions 23 have their axes X—X positioned substantially horizontally with reference to the position of the engine as illustrated. This provides for a very compact and light weight engine and also incorporates the improvements aforesaid in reference to the particular arrangement of sleeve driving parts.

As an illustration of further applications of my invention I have illustrated in outline form in Fig. 5 the application of my improved sleeve driving mechanism in connection with an engine of the type having cylinders in line, Fig. 5 illustrating a typical cylinder and associated sleeve driving mechanism. In this view the parts referred to above are given similar reference characters inasmuch as they are constructed as previously described and inasmuch as their operation and advantages are also similar.

Various modifications and changes will be apparent from my disclosure and it is not my intention to limit my invention to the particular form and construction of parts illustrated in detail.

What I claim as my invention is:

1. In an engine, a sleeve valve, a ball portion carried by the sleeve and having its axis positioned at an angle with a plane perpendicular to the sleeve axis, a valveshaft having a wobble crank, and a wobble link intermediate the wobble crank and ball portion, said wobble link having a socket engaging the ball portion.

2. In an engine, a sleeve valve, a ball portion carried by the sleeve and having its axis positioned at an angle with a plane perpendicular to the sleeve axis, a valveshaft having a wobble crank, and a wobble link intermediate the wobble crank and ball portion, said wobble link having a socket engaging the ball portion, and being adapted to oscillate about the center of the ball portion for substantially the same amount toward and from the sleeve relative to a co-planar position of said socket and ball portion.

3. In an engine, a sleeve valve, a ball portion carried by the sleeve and having its axis positioned at an angle with a plane perpendicular to the sleeve axis, a valveshaft having a wobble crank, and a wobble link intermediate the wobble crank and ball portion, said wobble link having a socket engaging the ball portion, said wobble link lying substantially in a plane between the ball portion and wobble crank whereby to operate the sleeve valve substantially without bending tendencies in the link.

4. In an engine, a sleeve valve, a ball portion carried by the sleeve and having its axis positioned at an angle with a plane perpendicular to the sleeve axis, a valveshaft having a wobble crank, and a wobble link intermediate the wobble crank and ball portion, said wobble link having a socket engaging the ball portion, and being adapted to oscillate about the center of the ball portion for substantially the same amount toward and from the sleeve relative to a co-planar position of said socket and ball portion, said wobble link lying substantially in a plane between the ball portion and wobble crank whereby to operate the sleeve valve substantially without bending tendencies in the link.

5. In an engine, a sleeve valve, a ball portion carried by the sleeve and having its axis positioned at an angle with a plane perpendicular to the sleeve axis, a valveshaft having a wobble crank, and a wobble link intermediate the wobble crank and ball portion, said wobble link having a socket engaging the ball portion, said axis of the ball portion extending inwardly and downwardly toward the inner portion of the sleeve.

6. In an engine of the sleeve valve type, a valveshaft, a sleeve driving lug having its axis positioned at an angle with a plane perpendicular to the sleeve axis, and sleeve driving means connecting the valveshaft and lug.

7. In an engine of the sleeve valve type, a valveshaft, a sleeve driving lug having its axis positioned at an angle with a plane perpendicular to the sleeve axis, and sleeve driving means connecting the valveshaft and lug, said lug extending downwardly and inwardly toward the inner portion of the sleeve.

8. In an engine having cylinders of the V-type, a sleeve valve associated with each of the V-arranged cylinders, a valveshaft for driving each of said sleeve valves, a link in the drive between each valveshaft and sleeve valve extending substantially vertically of a plane containing the axes of said valveshafts, and a sleeve driving lug between each link and associated sleeve valve extending substantially parallel to said plane.

9. In an engine having cylinders of the V-type, a sleeve valve associated with each of the V-arranged cylinders, a pair of valveshafts each having a wobble crank for respectively driving said sleeve valves, a wobble link in the drive between each wobble crank and sleeve valve extending substantially vertically, and a sleeve driving lug between each wobble link and the associated sleeve valve extending substantially horizontally.

ANDRE J. MEYER.